F. W. COOLEY.
DISTRIBUTING SPOUT.
APPLICATION FILED FEB. 24, 1920.
1,395,947.
Patented Nov. 1, 1921.
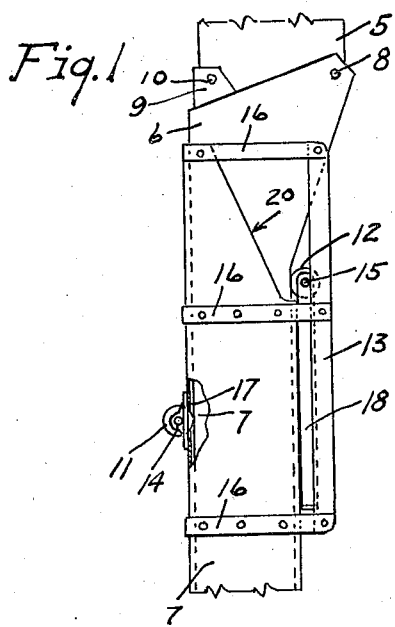
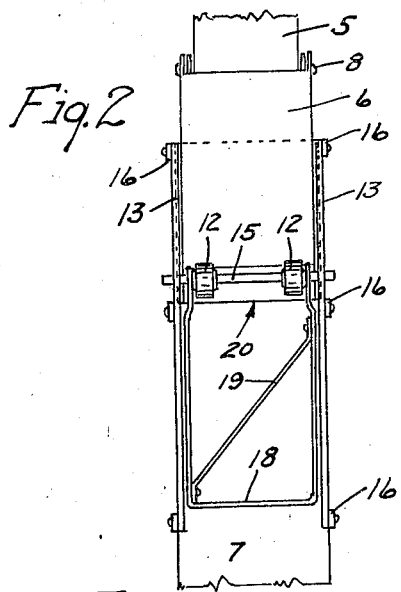
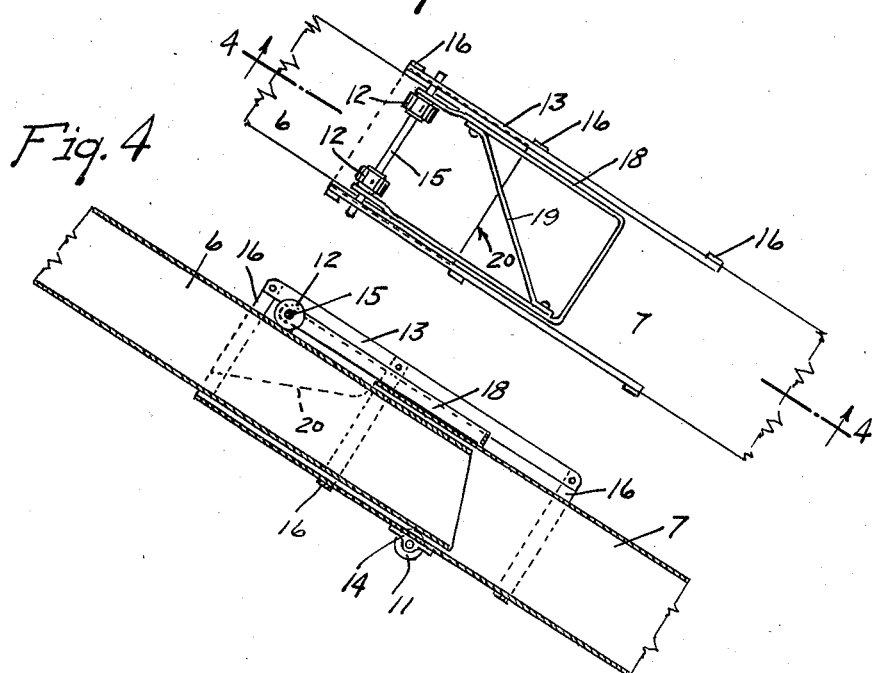
INVENTOR
Fred W. Cooley
BY HIS ATTORNEYS

UNITED STATES PATENT OFFICE.

FRED W. COOLEY, OF MINNEAPOLIS, MINNESOTA, ASSIGNOR TO JAMES J. GERBER, OF MINNEAPOLIS, MINNESOTA.

DISTRIBUTING-SPOUT.

1,395,947. Specification of Letters Patent. Patented Nov. 1, 1921.

Application filed February 24, 1920. Serial No. 360,779.

*To all whom it may concern:*

Be it known that I, FRED W. COOLEY, a citizen of the United States, residing at Minneapolis, in the county of Hennepin and State of Minnesota, have invented certain new and useful Improvements in Distributing-Spouts; and I do hereby declare the following to be a full, clear, and exact description of the invention, such as will enable others skilled in the art to which it appertains to make and use the same.

My invention relates to grain distributing spouts, chutes or conduits of the type generally used in grain elevators, for distributing grain to numerous bins contained in the elevator, and wherein the said chutes, conduits or spouts are usually made up of connected telescopic sections; and the invention has for its especial object to provide anti-friction leverage compensating devices for connecting the telescoping sections in such a manner that the leverage will be increased advantageously in proportion to the increase of the buckling strain, as the outer member of the telescoping spout or conduit section moves outward lengthwise of the inner section and becomes subject to greater load from the grain flowing therethrough.

My invention was especially designed for use in connection with the distributing spout and the mounting and usage thereof disclosed in my U. S. Patent, 1,268,218, of date June 4, 1918.

To the above ends, my invention consists of the novel devices and combinations of devices hereinafter described and defined in the claims.

In the accompanying drawings, which illustrate the invention, like notations refer to like parts throughout the several views.

Referring to the drawings:—

Figure 1 is a view in side elevation with some portions broken away, showing a distributing spout having my invention embodied therein, with the two telescoping sections of the spout telescoped to their limit, so as to afford the shortest length of the spout, and with the spout shown suspended in vertical position;

Fig. 2 is a view of the parts, shown in Fig. 1, in right side elevation, with respect to Fig. 1, or as they would appear in plan, if the distributing spout was in a horizontal position;

Fig. 3 is a view, similar to Fig. 2, as the parts would appear when the distributing spout was in an angular position, and the outer section had been moved outward to its limit on the inner section of the spout; and Fig. 4 is a longitudinal vertical section on the line 4—4 of Fig. 3.

The numeral 5 represents the lower part of the ordinary elevator head hopper spout to which the distributing spout chute or conduit, composed of the inner section 6 and the outer section 7, telescoping with each other, is pivoted by the pivotal connection 8, for swinging movement in a vertical plane. In other words, the hopper spout 5 always stands at a considerable distance above the bins of the elevator to which the grain is distributed through the distributing spout by shifting the latter into the different required positions for that purpose. Of course, the mouths of the bins will be at different distances from the hopper spout; and hence the necessity for the telescoping movement of the outer spout section 7 on the inner spout section 6. The spout sections, as illustrated, are shown as of rectangular form in cross section. The especial joint plate 9 is shown pivoted at 10 to the hopper spout 5 and extends into the mouth of the inner section 6 of the distributing spout, for coöperation therewith, as fully illustrated in my prior patent, above identified.

As illustrated, the outer spout section 7 is not cut square across at its receiving or mouth end, but is cut on an incline, as shown by the line marked with the numeral 20 in the several views, the result of which is that what may be called the under or bottom wall of the outer spout section 7 and portions of the side walls thereof, overlap the telescoped end of the inner spout section 6 for a greater length than does the opposite or face wall of the outer spout section 7, as best shown in Figs. 1 and 4. This is not a necessity but is a convenience for purposes which will presently appear.

Having regard now to my improvement, its primary purpose can be best understood by a brief reference to the structure disclosed in my prior patent above identified. If attention be given to Fig. 1 of the drawings of that patent, it becomes immediately obvious that the buckling strain on the telescoped spout sections, there illustrated, varies greatly, according to the position of the distributing spout. If the distributing spout is in a vertical position, there is practically no buckling strain, but, if it is in an angular position, there is always a buckling strain and this becomes greater and greater according to the extent to which the outer section has been extended lengthwise of the inner section, as shown in the full lines of that view. When the telescoped pipe sections are so extended, the buckling strain exists, whether the grain is passing through or not, but when the grain is passing through, it is, of course, much greater than when the spout is empty.

In practice, it has been found a difficult matter, prior to my invention, to so connect the telescoping sections as to resist this buckling strain. My invention entirely overcomes this difficulty by very simple means, which will now be noted.

A pair of rollers 11 are mounted in suitable bearing brackets 14 fixed to the under side wall or bottom of the outer spout section 7, near the edges thereof and at such points that they will be directly opposite to each other and will work through slots 17 in the said bottom wall of said spout section 7 and bear against the bottom wall of the inner spout section 6, as best shown in Figs. 1 and 4. These rollers 11 are so located that, when the telescoped sections 6 and 7 are extended to their limit, as shown in Figs. 3 and 4, the said rollers 11 will bear against the bottom wall of the spout section 6, at points not far from the delivery end of said spout section 6.

Another pair of rollers 12 are fixed to a common axle 15, inward of the outer ends thereof and so spaced apart that they will bear upon and travel on the top wall of the inner spout section 6 near the side walls of the same. The extended outer ends of the roller shaft 15 under-reach a pair of rails 13, which are fixed to the upper ends of a set of U-shaped brackets 16 fixed to the outer spout section 7 and rising above the top wall of the same for a sufficient distance to hold the rails 13 at the right height to ride on the extended ends of the shaft 15, when supported by the rollers 12 on the top wall of the inner spout section 6, as best shown in Figs. 1 and 4. To the roller shaft 15, are pivoted the inner ends of the side arms of a guide bail 18, the side arms of which are braced apart from each other by a diagonal brace 19. This bail 18 is of such size that its side arms fit snugly between the pair of rails 13 and of such length that its outer end always rides on the top wall of the outer spout section 7; and, from this relation of the parts, it follows that this bail 18 will always keep the roller shaft 15 at right angles to the rails 13 and the axis of the spout sections 6 and 7, and thereby prevent any angular motion of the roller shaft 15 and keep the rollers 12 in their proper working position. The rails 13 are of such length and so positioned that they extend beyond the receiving end of the spout section 7, at the top wall of the same, far enough to permit the two spout sections 6 and 7 to close together to the desired extent to let the distributing spout take its vertical position, as shown in Fig. 1, before the rollers 12 will strike the end of the upper wall of the spout 7 and stop their further closing movement. Otherwise stated, the roller shaft 15 and its rollers 12 are so located, in respect to the rails 13, and the spout sections 6 and 7, that the spout section 7, together with the rails 13 carried thereby may move outward for a considerable distance, without taking the shaft 15 and the rollers 12 with them. In other words, when the spout sections 6 and 7 are telescoped together to their limit, as shown in Figs. 1 and 2, the roller shaft 15 and its rollers 12 will occupy the positions there shown, being directly adjacent to the end of the upper wall of the spout section 7, but when the distributing spout takes its extreme angular position and the two spout sections 6 and 7 are separated as far as possible, the shaft 15 and its rollers 12 will be in the position shown in Figs. 3 and 4, or nearly twice as far away from the under pair of rollers 11 as when the parts are in the position shown in Fig. 1. This result is brought about from the fact that, as soon as the distributing spout begins to shift from its vertical position shown in Figs. 1 and 2 to an angular position, the buckling strain, coming onto the telescoped parts of the spout sections 6 and 7, will be taken on the respective pair of rollers 11 and 12, with the rollers 11 re-acting against the bottom wall of the inner spout section 6 and the rollers 12 re-acting against the top wall of said inner spout section 6; and, inasmuch as there is nothing to compel the shaft 15 and its rollers 12 to travel outward with the pipe section 7 and the rails 13, the said shaft 15 and its rollers 12 will lag behind, because of the friction or load thereon, while the rails 13 will travel over the under-reaching ends of the shaft 15. That this will occur in practice has been demonstrated by the results shown in the extensive use of this structure. Hence, it follows, of course, that the leverage for resisting the buckling strain on the telescoped ends of the spout sections 6 and 7 is far greater when the spout sections 6 and 7 are extended to their limit than when they are closed to or approximately to their inward telescoping limit; and, by making the parts of the proper relative proportions, the leverage can be increased in proportion to the increase of the buckling strain brought about by the outward extension of the telescoped spout sections and the load from the grain passing therethrough. In practice, it has been found that this entirely overcomes the tendency, which before existed, to crush and break the telescoped ends of the spout sections 6 and 7 by the buckling strains thereon. The parts 12 to 20 described thus constitute leverage compensating devices automatically positioned by movement of the chute sections 6 and 7. The rollers 11 and 12 form, in effect, relatively movable fulcrums for the ends of the chute sections, which ends act as levers tending to buckle and collapse the chutes. The rollers 11 and 12, rails 13, the bail 18 also constitute supports and strain resisting device for said chute sections.

At the same time, it is also obvious that the said described connections always support the telescoped ends of the spout sections 6 and 7 and the rollers 11 and 12 from anti-friction bearings with clearance between the telescoped parts of the spout sections, so that the one may be moved relative to the other with a minimum power.

It will be understood, of course, that the details of the construction can be widely varied, without departing from the spirit of my invention. So far as I know, I am the first to have provided any form of leverage compensating devices in the supporting connections for the telescoping sections of distributing spouts of any kind; and I desire to protect the same in the broadest possible way.

What I claim is:—

1. The combinaton with a distributing spout composed of telescoping sections, of leverage compensating devices including movable supporting members for said sections under a variable leverage which advantageously increases against the buckling strain on telescoped ends of said sections in proportion to the extent of their outward separating telescopic movement, substantially as described.

2. The combination with a distributing spout composed of telescoping sections, of leverage compensating devices comprising connections supporting one of the telescoped sections from the other and provided with two sets of fulcrums re-acting respectively against the upper and lower walls of that spout section which supports the other and which fulcrums are caused to spread apart from each other by the outward movement of one of the telescoping spout sections lengthwise of the other, substantially as described.

3. The combination with a distributing spout composed of two telescoping sections, of leverage compensating devices comprising connections supporting the outer spout section by the inner and provided with two sets of anti-friction rollers longitudinally spaced apart from each other and serving as fulcrums which re-act respectively against the upper and lower walls of the inner spout section against the buckling strain on the telescoped portions of said spout sections, and one set of which fulcruming rollers move outward with the outer spout section and the other set of which are free to lag behind on the inner spout section, thereby increasing the spread between the two sets of fulcruming rollers and the advantageous leverage against the buckling strain proportionate to the outward extension of the telescoped spout sections, substantially as described.

4. The combination with a distributing spout composed of two telescoping sections, of leverage compensating connections supporting the outer by the inner of said spout sections, and comprising a pair of guide rails fixed to the outer spout section spaced apart from each other and supported a short distance above the top wall of said spout section and projecting beyond the mouth of said outer spout section, two sets of anti-friction rollers, one set of which is carried by the bottom wall of the outer spout section and re-acts against the bottom wall of the inner spout section, and the other set of which rollers rests and travels on the top wall of the inner spout section and are fixed to a common shaft which underreaches portions of the said track rails, and a rectangular guide bail working between said track rails with the inner ends of its side arms pivoted to said roller shaft, all for coöperation, substantially as described.

5. The combination with a distributing spout comprising telescopically connected inner and outer sections, of an anti-friction roller journaled on the outer spout section and arranged to travel on the inner spout section, a pair of track rails carried by the outer spout section, and an anti-friction roller arranged to travel on the inner spout section and having a shaft on which the track rails have traveling movement, said anti-friction rollers being longitudinally spaced, the one from the other, and located on opposite sides of the spout.

6. The combination with a distributing spout comprising telescopically connected inner and outer sections, of an anti-friction roller journaled on the outer spout section and arranged to travel on the inner spout section, a pair of track rails carried by the outer spout section, an anti-friction roller arranged to travel on the inner spout section and having a shaft on which the track rails have traveling movement, said anti-friction rollers being longitudinally spaced, the one from the other, and located on opposite sides of the spout, and a frame carried by said shaft and guided by the track rails for imparting straight-line movement to the roller on said shaft.

7. In a device of the class described, two conduits having telescoping ends and supporting and strain resisting devices adapted to approach and separate, and means for retaining said devices in position carried by one of said conduits so that they are separated proportionately to the extension of said telescoped ends to resist the buckling strain on said ends.

8. In a device of the class described, two conduits having telescoping ends, means carried by the outer of said conduits for movably engaging and supporting the bottom of the inner conduit adjacent the end thereof, movable means engaging the top of the inner conduit, and means for retaining said last mentioned means in position carried by said outer conduit so that the two conduit engaging means will be moved toward each other when the conduits are moved together but will be separated when the conduits are extended.

In testimony whereof I affix my signature in presence of two witnesses.

FRED W. COOLEY.

Witnesses:
WINIFRED I. WARD,
HARRY D. KILGORE.